(12) United States Patent
Gane et al.

(10) Patent No.: US 8,563,643 B2
(45) Date of Patent: Oct. 22, 2013

(54) METHOD FOR MANUFACTURING A COATING SLIP, USING AN ACRYLIC THICKENER WITH A BRANCHED HYDROPHOBIC CHAIN, AND THE SLIP OBTAINED

(75) Inventors: Patrick Arthur Charles Gane, Rothrist (CH); Jean-Marc Suau, Lucenay (FR)

(73) Assignee: Omya International AG, Oftringen (CH)

( * ) Notice: Subject to any disclaimer, the term of this patent is extended or adjusted under 35 U.S.C. 154(b) by 344 days.

(21) Appl. No.: 12/735,089

(22) PCT Filed: Dec. 2, 2008

(86) PCT No.: PCT/IB2008/003394
§ 371 (c)(1),
(2), (4) Date: Jun. 15, 2010

(87) PCT Pub. No.: WO2009/077830
PCT Pub. Date: Jun. 25, 2009

(65) Prior Publication Data
US 2010/0311889 A1  Dec. 9, 2010

(30) Foreign Application Priority Data

Dec. 17, 2007 (EP) .................................. 07024440

(51) Int. Cl.
*C08L 33/10* (2006.01)
*C08L 23/06* (2006.01)
*C08K 3/26* (2006.01)
(52) U.S. Cl.
USPC ........... 524/427; 524/586; 524/568; 524/556; 524/555; 524/451; 524/447
(58) Field of Classification Search
USPC .......... 524/427, 586, 568, 556, 555, 457, 447
See application file for complete search history.

(56) References Cited

U.S. PATENT DOCUMENTS

| 5,514,212 | A | 5/1996 | Kurrle | |
|---|---|---|---|---|
| 6,057,398 | A * | 5/2000 | Blum | 524/507 |
| 6,093,764 | A | 7/2000 | Egraz et al. | |
| 6,414,074 | B1 * | 7/2002 | Blum | 524/507 |
| 7,790,800 | B2 * | 9/2010 | Suau et al. | 524/548 |
| 2004/0019148 | A1 | 1/2004 | Suau et al. | |
| 2008/0103248 | A1 | 5/2008 | Suau et al. | |
| 2010/0038046 | A1 | 2/2010 | Mongoin et al. | |

FOREIGN PATENT DOCUMENTS

| EP | 0 011 806 A1 | 6/1980 |
|---|---|---|
| EP | 0 248 612 A2 | 12/1987 |
| EP | 0509878 A1 | 10/1992 |
| EP | 0 567 214 A1 | 10/1993 |
| EP | 0839956 A2 | 5/1998 |
| EP | 0892111 A1 | 11/1998 |
| EP | 0 892 020 A1 | 1/1999 |
| FR | 2 872 815 | 1/2006 |
| GB | 2 127 836 A | 4/1984 |
| JP | 6219038 A | 8/1994 |
| JP | H11104479 A | 4/1999 |
| JP | H11116238 A | 4/1999 |
| JP | 2010506058 A | 10/2006 |
| WO | 9623105 A1 | 8/1996 |
| WO | 0186067 A1 | 11/2001 |
| WO | 0106007 A1 | 12/2001 |
| WO | WO 2004/005616 A2 | 1/2004 |
| WO | 2004041882 A1 | 5/2004 |
| WO | 2004041883 A1 | 5/2004 |
| WO | 2004044022 A1 | 5/2004 |
| WO | 2006016035 A1 | 2/2006 |
| WO | 2006081501 A1 | 8/2006 |
| WO | 2007069037 A1 | 6/2007 |

OTHER PUBLICATIONS

The International Search Report (in French) dated May 27, 2009 for PCT Application No. PCT/IB2008/003394.
The Written Opinion of the International Searching Authority (in French) for PCT Application No. PCT/IB2008/003394.
The English Translation of the Written Opinion of the International Searching Authority for PCT Application No. PCT/IB2008/003394.
The International Preliminary Report (in French) dated Jun. 22, 2010 for PCT Application No. PCT/IB2008/003394.
The Search Report dated Oct. 28, 2008 for European Application No. EP 07 02 4440.
Notice of Reasons for Rejection for Japanese Patent Application No. 2010-538936, dated Sep. 3, 2012.
English Translation of the Notice of Reasons for Rejection for Japanese Patent Application No. 2010-538936, dated Sep. 3, 2012.

* cited by examiner

*Primary Examiner* — Robert D. Harlan
(74) *Attorney, Agent, or Firm* — Amster, Rothstein & Ebenstein LLP

(57) ABSTRACT

The invention consists of a method for manufacturing a paper coating slip containing a mineral material, using, as an agent for thickening the slip, a water-soluble polymer comprising at least one ethylene-unsaturated anionic monomer, and at least one ethylene-unsaturated oxyalkyl monomer terminating in a branched hydrophobic alkyl, alkaryl, arylalkyl, aryl chain, saturated or unsaturated, with 14 to 21 carbon atoms and two branches each with at least six carbon atoms. The polymer is added to the slip either directly, or during a prior stage when grinding, dispersing, or concentrating the mineral material in water, which may or not be followed by a drying stage. In this way, the water retention of the slip is improved, which contributes to a better printability of the paper coated by the slip.

41 Claims, No Drawings

METHOD FOR MANUFACTURING A COATING SLIP, USING AN ACRYLIC THICKENER WITH A BRANCHED HYDROPHOBIC CHAIN, AND THE SLIP OBTAINED

This is a U.S. national phase of PCT Application No. PCT/IB2008/003394, filed Dec. 2, 2008, which claims the benefit of European Application No. 07 024 440.5, filed Dec. 17, 2007.

When manufacturing a sheet of coated paper, the first step consists of converting the pulp, by means of the paper machine, into an as yet uncoated sheet. The pulp essentially contains natural cellulose or synthetic fibres, water, and one or more mineral materials, such as calcium carbonate, as well as various other additives such as so-called "sticking" agents. In such a case, the use of a mineral material (such as calcium carbonate) is referred to as using a "filler".

The second step consists of coating the previously-obtained sheet. This operation consists of depositing on to the base paper surface a water-based compound known as a "coating slip", which contains notably water, one or more mineral materials such as calcium carbonate, one or more binders and also various additives. When manufacturing the coating slip, the use of a mineral material (such as calcium carbonate) is referred to as "coating pigments".

After being deposited on to the base, the coating slip has a natural tendency to transfer to the base paper all or some of the water and water-soluble or suspended substances the slip contains. It is then desirable to slow down this penetration into the base paper, with a view to maintaining a homogeneous distribution of water-soluble or suspended substances in the thickness of the coating slip thus deposited, which improves the final condition of the surface and the printability of the paper.

There are two ways to slow down the penetration of the coating slip into the paper, depending on whether one focuses on the coating slip or on the sheet of paper.

The first method consists of changing the absorption properties of the base paper by reducing its porosity or by increasing its degree of hydrophobicity. To this end, when manufacturing the sheet, it is possible to use special agents known as "slip penetration inhibitors" such as hydrophilic resins (JP 06-219038), hydrophobic "sticking" agents such as resins with aluminium sulphates (WO 96/23105), or even "treatment" agents which render hydrophobic the surface of the calcium carbonate used in the sheet as a filler; such agents are, for example, C16-C18 fatty acids (U.S. Pat. No. 5,514,212), or acrylate-, acrylonitrile- and styrene-based hydrophobic polymers (WO 01/86067).

Also of note is the French patent application filed as no. 06 08927, but not yet published as at this date, which describes the use of an aqueous suspension of calcium carbonate as a filler, dispersed and/or ground with the polymers which are the subject of this invention. This document therefore does not concern itself with the formulation of coating slips, nor does it describe the surprising effect of the polymers concerned by this invention as thickening agents for the slips. However, it does reveal the surprising manner in which the polymers, in conjunction with calcium carbonate used as a filler, make it possible to slow the penetration of the slip into a sheet of paper by increasing the sheet's degree of hydrophobicity.

On the other hand, the invention falls into the category of solutions which seek to slow the penetration of the slip by increasing its viscosity. When the slip's viscosity is increased in this way, its penetration into the sheet is slowed, i.e. the penetration of the water and water-soluble substances into the sheet of paper: this is referred to as improved "water retention".

In this respect, it is widely known that one can use starch, polyvinyl alcohol (PVOH), carboxymethylcellulose-based polymers (CMC), latexes, and highly carboxylated polymer emulsions, polycarboxylates such as polyacrylates, or that special class of polymers that swell up in alkalis, as water retention/thickening agents for coating slips. These products are described in particular in document EP 0 509 878, as the subject of an invention pertaining to polymers which swell in alkalis, and as the state of best practice for the other polymers mentioned above.

From a practical viewpoint, a professional in the trade uses acrylic thickening agents above all (such as Rheocoat™ 35 sold by COATEX™ or Sterocoll™ sold by BASF™) and cellulose agents (such as Finnfix™ sold by BASF™). Cellulose thickening agents, however, have the disadvantage of existing as powders which cause pollution problems in facilities (because of their powdery nature), as well as handling problems (since it is difficult to transport a powder through a tube), and must generally be placed in an aqueous solution, which involves the compounder in an additional step. The trade professional therefore prefers to use acrylic polymers, while remaining aware of increasingly restrictive environmental legislation, as indicated in documents WO 2006/081501 and EP 0 839 956: the aim is to lower the quantity of these acrylic polymers in coating formulations.

This latter restriction obviously applies to all acrylic polymers found in coating slips:
  the acrylic thickening agents mentioned above, which are added to the slip at the time it is manufactured,
  acrylic type dispersing and grinding aid agents, used during the dispersion, grinding, addition or concentration stage of a calcium carbonate in an aqueous medium, possibly followed by a drying stage, the resulting suspension, dispersion or dry matter then being used in the manufacture of the coating slip.

The technical problem addressed by this application may therefore be considered to be:
  to find a solution for slowing the penetration of a coating slip into a coated sheet of paper coated with the slip,
  the use of acrylic polymers preferred to cellulose thickening agents in powder form,
  the need to reduce the total quantity of acrylic polymers (thickening, dispersing, and grinding aid agents) used in the slip manufacturing procedure overall, including both the manufacture of an aqueous suspension of mineral material, then the manufacture of the slip from the suspension or dispersion or dry mineral material previously obtained.

This slowing of the penetration of the slip into the sheet of paper will result from an increase in the viscosity of the slip and from better water retention. Ultimately, it will lead to improvements in the printability properties of the coated sheet of paper.

To this end, the applicant has developed a method for manufacturing a papermaking coating slip containing at least one mineral material, characterised by:
  the use of a water-soluble polymer as an agent for thickening the slip, consisting of:
    a) at least one ethylene-unsaturated anionic monomer,
    b) and at least one ethylene-unsaturated oxyalkyl monomer terminating in a branched hydrophobic alkyl, alkaryl, arylalkyl, aryl chain, saturated or unsaturated, with 14 to 21 carbon atoms and two branches each with at least 6 carbon atoms.

and that the polymer is used by direct addition to the slip and/or during a dispersion and/or grinding and/or concentration stage of the mineral material in water, possibly followed by a drying stage.

"Direct addition" means that the polymer is added directly into the coating slip, which already contains the mineral material. With other means of addition, a mineral material is initially dispersed and/or ground and/or concentrated into water in the presence of the polymer, possibly followed by a drying stage, and the suspension or aqueous dispersion or dried material obtained is then used in the manufacture of the coating slip.

In each of these methods, a reduction in the overall quantity of acrylic polymers used is achieved (the dispersing agent, grinding aid and thickening agent) compared with the same slip not containing the polymer, which is the subject of this invention, and this is achieves equivalent or even improved performance in terms of thickening and water retention.

The resulting coating slips, compared to those produced using previous practice and not containing the polymer:
- have a greater thickening effect (Brookfield™ viscosities at 10 and 100 revolutions per minute at 25° C.), and better water retention, while containing a quantity of acrylic polymers by weight (dispersing, grinding and thickening agents) equal to that contained in slips produced using previous methods,
- or exhibit a thickening effect (Brookfield™ viscosities at 10 and 100 revolutions per minute at 25° C.) and identical water retention, while containing a quantity by weight of acrylic polymers (dispersing, grinding, and thickening agents), lower than that in slips produced using previous methods.

Furthermore, apart from producing improved properties in the final slip, the polymer also makes it possible to achieve dispersions and aqueous suspensions of mineral materials (when added during a dispersion, grinding, addition or concentration in an aqueous medium stage), which are entirely acceptable to the professional, i.e. especially suited to pumping and handling. In practical terms, dispersions and aqueous suspensions are achieved by a Brookfield™ viscosity at 100 revolutions per minute and at 25° C. lower at 1000 mPa·s.

To explain such results, though without making a link to any particular theory, the applicant thinks that the invented polymer may develop properties for stabilising, dispersing, and grinding mineral materials in water but also thickening effects in the presence of latex, via binding interactions between its hydrophobic R' groups and the latexes contained in the coating slip. Such interactions would be the cause of a thickening effect induced by the invention of this polymer.

This latter result is all the more surprising because acrylic acid polymers with a formula (I) monomer and a hydrophobic R' lateral string are already known about, with professionals having already widely varied the length of the R' string, though without ever achieving a thickening effect. This is because all these polymers are described as mineral load dispersing agents: thus, this dispersion mechanism is related to a shear thinning phenomenon, and not to the thickening effect being sought here by the professional.

Document EP 1 294 476 thus describes polymers with an anionic monomer, like acrylic acid, and a formula-(I) monomer, in which R' designates a weakly hydrophobic radical with 1 to 5 carbon atoms; these polymers behave especially well as excellent calcium carbonate dispersing agents.

Document EP 1 565 504 describes copolymers of acrylic acid and a formula-(I) monomer in which R' possesses very broadly 1 to 40 carbon atoms; these polymers improve the optical brightening of the coating slips, and may be added to them via a calcium carbonate dispersal stage. Documents EP 1 569 970 and EP 1 572 764 describe the same chemical structures, but used as a grinding aid agent and an agent for improving the brightness of a coated sheet of paper respectively.

Document WO 2007/069037 discloses that polymers of acrylic acid and a formula-(I) monomer in which R' possesses 1 to 40 carbon atoms but which is preferably the methyl group, makes possible constant improvement in the water retention of a coating slip, while maintaining its viscosity at a relatively low level.

Finally, documents EP 0 892 020 and EP 0 892 111 instruct that the particular choice, for R', of a hydrophobic radical with at least 22 carbon atoms makes it possible for polymers of acrylic acid and a formula-(I) monomer to effectively disperse or grind both water-absorbent (calcium carbonate) and hydrophobic (talc) mineral materials in water.

Consequently, previous practice had already envisaged numerous possibilities for the R' group: each of them was clearly leading to a dispersing polymer, grinding aid or one which improved brightness or optical brightening, and not a paper coating slip thickening agent. One of the applicant's points of merit is to have imagined, in the first place, that the choice of a different R' group would lead to a thickening effect.

Another of her merits is that she then knew to identify such R' groups by way of a very particular choice of a branched hydrophobic string with 14 to 21 carbon atoms and with two branches each with at least six carbon atoms. Nothing revealed or suggested such a choice; nothing gave any indication that such a choice might lead to such a remarkable technical effect: the reduction in the quantity of acrylic polymers in the coating slip giving a thickening performance equivalent to previous methods.

Also, an initial aim of the invention consists of a procedure for manufacturing a paper coating slip containing at least one mineral material, characterised:
- by the fact that it uses as a thickening agent for the slip, a water-soluble polymer comprising:
  a) at least one ethylene-unsaturated anionic monomer,
  b) and at least one ethylene-unsaturated oxyalkyl monomer terminating in a branched hydrophobic alkyl, alkaryl, arylalkyl, aryl chain, saturated or unsaturated, with 14 to 21, and preferably 15 to 20, carbon atoms and two branches each with at least 6 carbon atoms,
- and in that the polymer is used by directly adding it to the slip and/or during a dispersion and/or grinding and/or concentration stage of the mineral material in water, possibly followed by a drying stage.

This method is further characterised by the fact that the polymer comprises, expressed as a percentage by weight of each of the monomers (with the total of these percentages being equal to 100%):
a) between 5% and 95%, preferably 50% to 95%, ideally 70% to 95% of at least one ethylene-unsaturated anionic monomer,
b) between 5% and 95%, preferably 5% to 50%, and ideally 5% to 30% of at least one ethylene-unsaturated oxylakyl monomer terminating in a branched hydrophobic alkyl, alkaryl, arylalkyl, aryl chain, saturated or unsaturated, with 14 to 21, and preferably 15 to 20, carbon atoms and two branches each with at least six carbon atoms.

This method is also characterised by the fact that monomer a) is chosen from among acrylic acid, methacrylic acid, and mixtures thereof.

This method is further characterised by the fact that monomer b) is a formula-(I) monomer:

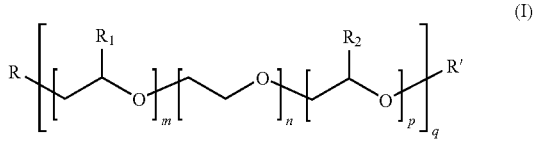

where:
- m, n, p and q are integers and m, n, p are less than 150, q is greater than 0 and at least one integer from among m, n, and p is non-zero,
- R is a radical with a polymerisable unsaturated function, preferably belonging to the vinyls group and also to the acrylic, methacrylic, maleic, itaconic, crotonic, and vinylphtalic esters group, and to the unsaturated urethanes group, including acrylurethanes, methacrylurethanes, α-α' dimethylisopropenyl-benzylurethanes, allyl urethanes, as well as to the group of allyl or vinyl esters, whether substituted or not, or to ethylene-unsaturated amides or imides group,
- $R_1$ and $R_2$ are identical and represent hydrogen atoms or alkyl groups,
- R' represents a branched hydrophobic alkyl, alkaryl, arylalkyl, aryl chain, saturated or unsaturated, having 14 to 21, and preferably 15 to 20, carbon atoms and two branches each with at least six carbon atoms, and in that R' is ideally chosen from among 2-hexyl 1-decanyl, 2-octyl 1-dodecanyl and mixtures thereof.

This method is also characterised by the fact that the water-soluble polymer is partially or completely neutralised by one or more neutralising agents having a monovalent or polyvalent function, preferably chosen from sodium or potassium hydroxide or mixtures thereof.

This method is further characterised by the fact that the mineral material is chosen from natural or synthetic calcium carbonate, kaolin, talc, or mixtures thereof, and by the fact that it is preferably a natural or synthetic calcium carbonate or kaolin or mixture thereof, and in that it is ideally a mixture of natural calcium carbonate and kaolin.

The method is further characterised by the fact that it uses 0.1% to 2%, and preferably 0.2% to 0.8% by dry weight of the polymer, in relation to the dry weight of the mineral material.

A second object of the invention consists of a paper coating slip containing at least one mineral material, and characterised by the fact that it contains, as a thickening agent, a water-soluble polymer comprising:
- a) at least one ethylene-unsaturated anionic monomer,
- b) and at least one ethylene-unsaturated oxyalkyl monomer terminating in a branched hydrophobic alkyl, alkaryl, arylalkyl, aryl chain, saturated or unsaturated, with 14 to 21, and preferably 15 to 20, carbon atoms and two branches each with at least six carbon atoms.

This coating slip is further characterised by the fact that the polymer comprises, expressed as a percentage by weight of each of the monomers (with the total of these percentages being equal to 100%):
- a) between 5% and 95%, preferably 50% to 95%, and ideally 70% to 95% of at least one ethylene-unsaturated anionic monomer,
- b) between 5% and 95%, preferably 5% to 50%, and ideally 5% to 30% of at least one ethylene-unsaturated oxyalkyl monomer terminating in a branched hydrophobic alkyl, alkaryl, arylalkyl, aryl chain, saturated or unsaturated, with 14 to 21, and preferably 15 to 20 carbon atoms, and two branches each with at least six carbon atoms.

This coating slip is also characterised by the fact that monomer a) is chosen from among acrylic acid, methacrylic acid and mixtures thereof.

This coating slip is also characterised by the fact that monomer b) is a formula-(I) monomer:

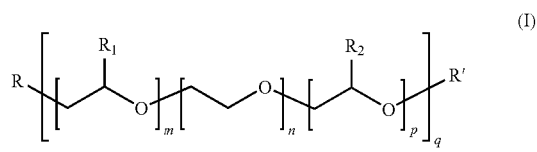

where:
- m, n, p and q are integers and m, n and p are less than 150, q is greater than 0 and at least one integer from among m, n, and p is non-zero,
- R represents a radical containing a polymerisable unsaturated function, preferably belonging to the vinyls group as well as to the acrylic, methacrylic and maleic esters group and also to the unsaturated urethanes group, including acrylurethane, methacrylurethane, α-'α dimethyl-isopropenyl-benzylurethane, allyl urethane, as well as to the allyl or vinyl ethers group, whether substituted or not, or to the ethylene-unsaturated amides or imides group,
- $R_1$ and $R_2$ are identical and represent hydrogen atoms or alkyl groups,
- R' represents a branched hydrophobic alkyl, alkaryl, arylalkyl, aryl chain, saturated or unsaturated, with 14 to 24, and preferably 15 to 20, carbon atoms and two branches each with at least 6 carbon atoms, and in that R' is ideally chosen from among 2-hexyl 1-decanyl, 2-octyl 1-dodecanyl and mixtures thereof.

This coating slip is further characterised by the fact that the water-soluble polymer is partially or completely neutralised by one or more neutralising agents having a monovalent or polyvalent function, preferably chosen from sodium or potassium hydroxide or mixtures thereof.

This coating slip is further characterised by the fact that the mineral material is chosen from among natural or synthetic calcium carbonate, kaolin, talc, and mixtures thereof, and in that it is preferably a natural or synthetic calcium carbonate or kaolin or mixture thereof, and in that it is ideally a mixture of natural calcium carbonate and kaolin.

This coating slip is further characterised by the fact that it contains 0.1% to 2%, and preferably 0.2% to 0.8% by dry weight of the polymer, in relation to the dry weight of the mineral material.

EXAMPLES

Example 1

This test illustrates the invention process, in which the polymer invented is used in an aqueous suspension of calcium carbonate, during an addition or grinding stage. These suspensions are then used in the manufacture of coating slips which have improved water retention and thickening, compared to a coating slip made using previous methods, resulting from an aqueous suspension of calcium carbonate without the polymer which is the subject of this invention, both slips ultimately having the same quantity of acrylic polymer (dispersing agent or grinding aid added to the aqueous suspension plus a thickening agent added to the slip).

Test No. 1

This test illustrates the previous method, and uses, by adding in an aqueous suspension made from calcium carbonate (Norwegian marble) sold by OMYA™ under the name Setacarb™ ME, 0.2% by dry weight in relation to the dry weight of the carbonate of an acrylic acid homopolymer:

of which 70% by molar weight of the carboxylic sites are neutralised by sodium and 30% by molar weight of the carboxylic sites are neutralised by lime, and whose molecular weight is equal to 5,500 g/mole (as determined using the method described in the document WO 2007/069037).

As a result, an aqueous suspension is obtained whose content, by dry weight, of calcium carbonate is equal to 74.2% of its total weight, and whose Brookfield™ viscosity, measured at 100 revolutions per minute, is less than 1000 mPa·s, which makes it perfectly easy for the user to handle.

Test No. 1a

This test illustrates the invention, and uses, by adding to the aqueous suspension created from calcium carbonate (Norwegian marble) sold by the company OMYA™ under the name Setacarb™ ME, 0.2% by dry weight of the carbonate of a completely water-soluble polymer neutralised by sodium and comprising:

a) 75% by weight of acrylic acid,
b) 25% by weight of the formula-(I) monomer, in which:
   R represents a methacrylate radical,
   R' represents a linear hydrophobic string with 16 carbon atoms of 2-hexyl 1-decanyl,
   m=p=0, q=1, n=25.

As a result, an aqueous suspension similar to that obtained in test no. 1 is obtained, because its dry weight content of calcium carbonate is equal to 74.1% of its total weight, and because its Brookfield™ viscosity, measured at 100 revolutions per minute, is less than 1,000 mPa·s, which makes it perfectly easy for the user to handle.

Test No. 2

This test illustrates previous practice, and uses, by adding in an aqueous suspension created from a calcium carbonate (Norwegian marble) sold by OMYA™ under the name H90™ ME, 0.2% by dry weight, in relation to the dry weight of the carbonate, an acrylic acid homopolymer:

of which 70% by molar weight of the carboxylic sites are neutralised by sodium and 30% by molar weight of the carboxylic sites are neutralised by lime, and whose molecular weight is equal to 5,500 g/mole (as determined using the method described in document WO 2007/069037).

As a result, an aqueous suspension is obtained whose content, by dry weight, of calcium carbonate is equal to 77.1% of its total weight, and whose Brookfield™ viscosity, measured at 100 revolutions per minute, is less than 15.00 mPa·s, which makes it difficult to handle, and particularly hard to pump.

Test No. 2a

This test illustrates the invention, and uses, by adding to the aqueous suspension created from calcium carbonate (Norwegian marble) sold by OMYA™ under the name H90™ ME, 0.2% by dry weight of the carbonate of a water-soluble polymer completely neutralised by sodium and comprising:

a) 75% by weight of acrylic acid,
b) 25% by weight of the formula-(I) monomer, in which:
   R represents a methacrylate radical,
   R' represents a linear hydrophobic string with 16 carbon atoms of 2-hexyl 1-decanyl,
   m=p=0, q=1, n=25.

As a result, an aqueous suspension similar to that obtained in test no. 2 is obtained, with its dry weight content of calcium carbonate being equal to 77.4% of its total weight. However, its Brookfield™ viscosity, measured at 100 revolutions per minute, is lower than 1,000 mPa·s, which makes it perfectly easy for the user to handle, unlike the suspension obtained in test no. 2.

Test No. 3

This test illustrates previous practice, and uses, during the grinding stage, a calcium carbonate (French calcite) whose diameter, in order that 50% by weight of the particles have a diameter greater than this value, is 6.7 μm, 1% by dry weight in relation to the dry weight of the carbonate of a homopolymer of acrylic acid:

of which 70% by molar weight of the carboxylic sites are neutralised by sodium and 30% by molar weight of the carboxylic sites are neutralised by lime, and whose molecular weight is equal to 5,500 g/mole (as determined using the method described in the document WO 2007/069037).

As a result, an aqueous suspension is obtained whose content, by dry weight, of calcium carbonate is equal to 71.7% of its total weight, of which 58.9% and 88.5% by weight of the particles respectively are less than 1 μm and 2 μm, and whose Brookfield™ viscosity, measured at 100 revolutions per minute, is less than 1,000 mPa·s, which makes it perfectly easy for the user to handle.

Test No. 3a

This test illustrates the invention, and uses, during a grinding stage, a calcium carbonate (French calcite) whose diameter, in order that 50% by weight of the particles have a diameter greater than this value, is 6.7 μm, 1% by dry weight in relation to the dry weight of the carbonate of a water-soluble polymer completely neutralised by sodium and comprising:

a) 75% by weight of acrylic acid,
b) 25% by weight of the formula-(I) monomer, in which:
   R represents a methacrylate radical,
   R' represents a linear hydrophobic string with 16 carbon atoms of 2-hexyl 1-decanyl,
   m=p=0, q=1, n=25.

As a result, an aqueous suspension similar to that obtained for test no. 3 is obtained, because its dry weight content of calcium carbonate is equal to 71.4% of its total weight, which shows 57.8% and 87.4% by weight of the particles are smaller than 1 μm and 2 μm respectively; additionally, its Brookfield™ viscosity, measured at 100 revolutions per minute, is less than 1,000 mPa·s, which makes it perfectly easy for the user to handle.

For tests nos. 3 and 3a, the grinding is carried out using the method described in document WO 01/96007.

For each of the tests nos. 1 to 3a, a paper coating slip was then created, comprising:

100 parts by dry weight of the aqueous suspension of calcium carbonate to be tested, 11 parts by dry weight of the styrene-butadiene latex sold by DOW™ CHEMICALS under the name DL 966, for each 100 parts by dry weight of calcium carbonate, 0.25 parts by dry weight of polyvinyl alcohol, per 100 parts by dry weight of calcium carbonate, 0.6 parts by dry weight of an optical brightener sold by CLARIANT™ under the name Blancophor™ P, per 100 parts by dry weight of calcium carbonate, 0.4 parts by dry weight of an acrylic thickener/water retainer sold by COATEX™ under the name Rheocarb™.

For each of the slips obtained from tests 1 to 3a, the Brookfield™ viscosities are then determined at 10 and 100 revolutions per minute 25° C., as is their water retention. This is determined using an AAGWR device sold by GRADEK™. It comprises a measurement chamber, into which a piece of test paper known as "Test Blotter Paper" is placed, covered with a perforated plastic sheet known as a "Test Filter PCTE", with both the paper and the sheet being sold by GRADEK™.

Then, 10 ml of the coating slip to be tested are added to the chamber.

The AAGWR device exerts a certain amount of pressure on the coating slip, causing all or some of the water and water-soluble substances contained in the slip to pass through the perforated plastic sheet and penetrate the test paper.

In practical terms, a pressure of 0.5 bar is applied for 90 seconds.

The difference between the weight of the test paper before and after the experiment gives the weight of the water and water-soluble substances contained within the slip that penetrated into the test paper during the experiment.

All the results for tests nos. 1 to 3a are shown in table 1.

TABLE 1

|  | Test no. | | | | | |
| --- | --- | --- | --- | --- | --- | --- |
|  | 1 | 1a | 2 | 2a | 3 | 3a |
| Previous method (PA) Invention (IN) | PA | IN | PA | IN | PA | IN |
| μ10 (mPa·s) | 4280 | 4360 | 2880 | 3560 | 1400 | 5660 |
| μ100 (mPa·s) | 860 | 960 | 620 | 890 | 415 | 1450 |
| PA GWR (g/m2) | 249 | 203 | 92 | 82 | 106 | 67 |

If the findings are compared in pairs, it can be seen that the Brookfield™ viscosities are always greater when this invention is used; this is even more remarkable for test no. 2a, in which the initial suspension is much more fluid than the one corresponding to test no. 2.

Similarly, water retention is always much less when the invention is used, which means that the coating slip has penetrated through the base paper less. The printability of the resulting paper will therefore be better, and this will be true for an equal quantity of acrylic polymer (dispersing or grinding agent when manufacturing the aqueous suspension, and a thickening agent when manufacturing the coating slip) equal to that used in practice.

Example 2

This test illustrates the invention method, in which the newly-invented polymer is used in an aqueous suspension of calcium carbonate, during a dispersion or concentration stage. These suspensions are then used in the manufacturing of coating slips which have improved water retention and thickening compared to a coating slip made using previous methods, produced by an aqueous suspension of calcium carbonate without the newly-invented polymer, both slips ultimately having the same quantity of acrylic polymer (a dispersing agent or grinding aid added to the aqueous suspension plus a thickening agent added to the slip).

Test No. 4

This test illustrates previous practice and uses, for the purpose of dispersing a cake of calcium carbonate (Norwegian marble) in water, ground without the use of a grinding aid, of which 60% by dry weight of the particles have a median diameter less than 1 μm, 0.4% by dry weight in relation to the dry weight of the carbonate, a copolymer of acrylic acid and maleic anhydride (in a mass ratio of 70:30):
  completely neutralised by sodium,
  and whose molecular weight is equal to 15,600 g/mole (as determined using the method described in document WO 2007/069037).

As a result, an aqueous suspension is obtained whose content, by dry weight, of calcium carbonate is equal to 67.4% of its total weight, and whose Brookfield™ viscosity, measured at 100 revolutions per minute, is less than 1,000 mPa·s, which makes it perfectly easy for the user to handle.

Test No. 4a

This test illustrates the invention, and uses, for the purpose of dispersing calcium carbonate (Norwegian marble) in water, 0.4% by dry weight in relation to the dry weight of the carbonate, a water-soluble polymer comprising:
  a) 75% by weight of acrylic acid,
  b) 25% by weight of the formula-(I) monomer, in which:
    R represents a methacrylate radical,
    R' represents a linear hydrophobic string with 16 carbon atoms of carbon 2-hexyl 1-decanyl,
    $m=p=0$, $q=1$, $n=25$.

As a result, an aqueous suspension similar to that obtained in test no. 4 is obtained, because its dry weight content of calcium carbonate is equal to 67.0% of its total weight, and because its Brookfield™ viscosity, measured at 100 revolutions per minute, is lower than 1,000 mPa·s, which makes it perfectly easy for the user to handle.

Test No. 5

This test illustrates previous practice, and uses, during a concentration stage an aqueous suspension of calcium carbonate (Finnish marble) with an initial dry extract of 20%, 0.8% by dry weight of the carbonate of a copolymer of acrylic acid and maleic anhydride (in a mass ratio of 70:30):
  completely neutralised by sodium,
  and whose molecular weight is equal to 15,600 g/mole (as determined using the method described in document WO 2007/069037).

As a result, an aqueous suspension is obtained whose content, by dry weight, of calcium carbonate is equal to 71.5% of its total weight, and whose Brookfield™ viscosity, measured at 100 revolutions per minute, is lower than 1,000 mPa·s, which makes it perfectly easy for the user to handle.

Test No. 5a

This test illustrates the invention, and uses, during a stage concentrating an aqueous suspension of calcium carbonate (Finnish marble) with an initial dry extract of 20%, 0.8% by dry weight of the carbonate of a water-soluble polymer completely neutralised by sodium and comprising:
  a) 75% by weight of acrylic acid,
  b) 25% by weight of the formula-(I) monomer, in which:
    R represents a methacrylate radical,
    R' represents a linear hydrophobic string with 16 carbon atoms of carbon 2-hexyl 1-decanyl,
    $m=p=0$, $q=1$, $n=25$.

As a result, an aqueous suspension similar to that obtained in test no 2 is obtained, with its dry weight content of calcium carbonate being equal to 71.4% of its total weight. However, its Brookfield™ viscosity, measured at 100 revolutions per minute, is lower than 1,000 mPa·s, which makes it perfectly easy for the user to handle, unlike the suspension obtained for test no. 2.

For tests nos. 5 and 5a, the concentration is produced using the method well known to trade professionals, using a thermal concentrator sold by EPCOM™.

For each of the tests nos. 6 to 6a, a paper coating slip was then created, comprising:
  70 parts by dry weight of the aqueous suspension of calcium carbonate to be tested,
  30 parts by dry weight of a powdered kaolin sold by HUBER™ under the name Hydragloss™ 90, 11 parts by dry weight of the styrene-butadiene latex sold by DOW™ CHEMICALS under the name DL 966, per 100 parts by dry weight of calcium carbonate, 1 part by dry weight of polyvinyl alcohol, per 100 parts by dry weight of calcium carbonate, 1 part by dry weight of an optical brightener sold by CLARIANT™ under the name Blancophor™ P, per 100 parts by dry weight of calcium carbonate, 0.8 parts by dry weight of an acrylic thickener/water retainer sold by COATEX™ under the name Rheocarb™.

For each of the slips obtained from tests nos. 4 to 5a, the Brookfield™ viscosities were then determined at 10 and 100 revolutions per minute 25° C., as were their water retentions.

All the results obtained are shown in table 2:

TABLE 2

|  | Test no. | | | |
| --- | --- | --- | --- | --- |
|  | 4 | 4a | 5 | 5a |
| Previous method (PA) Invention (IN) | PA | IN | PA | IN |
| μ10 (mPa · s) | 1880 | 3000 | 1280 | 3480 |
| μ100 (mPa · s) | 455 | 660 | 320 | 830 |
| PA GWR (g/m2) | 130 | 118 | 199 | 123 |

If the findings are compared in pairs, it can be seen that the Brookfield™ viscosities are always greater when the invention is used, and that the water retention is much less with the invention, which means that that the coating slip has penetrated through the base paper less.

The printability of the resulting paper will therefore be improved, and this will be true for an equal quantity of acrylic polymer (a dispersing or grinding agent when manufacturing the aqueous suspension, and a thickening agent when manufacturing the coating slip) equal to that used in previous methods.

Example 3

This test illustrates the method using the invention, in which the invented polymer is used in an aqueous suspension of calcium carbonate, during a grinding stage. These suspensions are then used in the manufacture of coating slips with improved water retention and thickening compared to coating slips made using previous methods resulting from an aqueous suspension of calcium carbonate without the newly-invented polymer, both slips ultimately having the same quantity of acrylic polymer (a dispersing agent or grinding aid added to the aqueous suspension plus a thickening agent added to the slip).

Test No. 6

This test illustrates previous practice, and uses, for the purpose of grinding a calcium carbonate (French chalk) in water such that 50% by weight of the particles have a diameter greater than 2.4 μm, 0.45% by dry weight with respect to the dry weight of the carbonate of a homopolymer of acrylic acid:

of which 70% by molar weight of the carboxylic sites are neutralised by sodium and 30% by molar weight of the carboxylic sites are neutralised by lime, and whose molecular weight is equal to 5,500 g/mole (as determined using the method described in document WO 2007/069037).

As a result, an aqueous suspension is obtained whose content, by dry weight, of calcium carbonate equals 73.9% of its total weight, of which 39.6% and 76.7% by weight of particles are less than 1 μm and 2 μm respectively, and whose Brookfield™ viscosity, measured at 100 revolutions per minute, is less than 1,000 mPa·s, which makes it perfectly easy for the user to handle.

Test No. 6a

This test illustrates the invention, and uses, for the purpose of grinding in water a calcium carbonate (French chalk) such that 50% by weight of the particles have a diameter greater than 2.4 μm, 0.45% by dry weight with respect to the dry weight of the carbonate of a water-soluble polymer comprising:

a) 75% by weight of acrylic acid,
b) 25% by weight of the formula-(I) monomer, in which:
R represents a methacrylate radical,
R' represents a linear hydrophobic string with 16 carbon atoms of carbon 2-hexyl 1-decanyl,
m=p=0, q=1, n=25.

As a result, an aqueous suspension similar to that obtained in test no. 6 is obtained whose content, by dry weight, of calcium carbonate is equal to 73.5% of its total weight, of which 37.8% and 75.8% by weight of the particles are less than 1 μm and 2 μm respectively and whose Brookfield™ viscosity, measured at 100 revolutions per minute, is less than 1,000 mPa·s, which makes it perfectly easy for the user to handle.

For both tests no. 6 and 6a, a paper coating slip is then produced, comprising:

100 parts by dry weight of the aqueous suspension of calcium carbonate to be tested, 8 parts by dry weight of the styrene-butadiene latex sold by DOW™ CHEMICALS under the name DL 966, per 100 parts by dry weight of calcium carbonate, 4 parts by dry weight of a starch sold by ROQUETTE™ under the name Amilys™, 1.5 parts by dry weight of an optical brightener sold by CLARIANT™ under the name Blancophor™ P per 100 parts by dry weight of calcium carbonate, 0.3 parts by dry weight of an acrylic thickener/water retainer sold by COATEX™ under the name Rheocarb™.

For each of the slips obtained from tests nos. 4 to 5a, the Brookfield™ viscosities are then determined at 10 and 100 revolutions per minute 25° C., as are their water retentions. The results obtained are shown in table 3.

TABLE 3

|  | Test no. | |
| --- | --- | --- |
|  | 6 | 6a |
| Previous method (PA) Invention (IN) | PA | IN |
| μ10 (mPa · s) | 1760 | 5440 |
| μ100 (mPa · s) | 380 | 1000 |
| PA GWR (g/m2) | 136 | 86 |

If the findings are compared, it can be seen that the Brookfield™ viscosities are always greater when the invention is used, and that the water retention is much less with the invention, which means that that the coating slip has penetrated less into the base paper.

The printability of the resulting paper will therefore be better, and this will be true for an equal quantity of acrylic polymer (a dispersing or grinding agent when manufacturing the aqueous suspension and a thickening agent when manufacturing the coating slip) equal to that used in previous methods.

Example 4

This test illustrates the use of the invented polymer in an aqueous suspension of calcium carbonate, during a grinding stage. This suspension is then used in the manufacture of coating slips which have improved water retention and thickening, compared to a coating slip made using previous practice resulting from an aqueous suspension of calcium carbonate without the invented polymer, both slips ultimately having the same quantity of acrylic polymer (a dispersing agent or grinding aid added to the aqueous suspension plus a thickening agent added to the slip).

Test No. 7

This test illustrates the previous method and uses, during the grinding stage of a calcium carbonate (French calcite) whose diameter, in order that 50% by weight of the particles have a diameter greater than this value, is 6.7 μm, 1% by dry weight in relation to the dry weight of the carbonate of a homopolymer of acrylic acid:

c) of which 70% by molar weight of the carboxylic sites are neutralised by sodium and 30% by molar weight of the carboxylic sites are neutralised by lime,
d) and whose molecular weight equals 5,500 g/mole (as determined using the method described in document WO 2007/069037).

Test No. 8

This test illustrates the invention, and uses, during the grinding stage of a calcium carbonate (French calcite) whose diameter, in order that 50% by weight of the particles have a diameter greater than this value, is 6.7 μm, 1% by dry weight in relation to the dry weight of the carbonate of a water-soluble polymer completely neutralised by sodium and comprising:

a) 85% by weight of acrylic acid,
b) 15% by weight of the formula-(I) monomer, in which:
 1. R represents a methacrylate radical,
 2. R' represents a branched hydrophobic chain with 16 carbon atoms of 2-hexyl 1-decanyl,
 3. m=p=0, q=1, n=25.

Test No. 9

This test illustrates the invention, and uses, during the grinding stage of a calcium carbonate (French calcite) whose diameter, in order that 50% by weight of the particles have a diameter greater than this value, is 6.7 μm, 1% by dry weight in relation to the dry weight of the carbonate of a water-soluble polymer completely neutralised by sodium and comprising:

a) 85% by weight of acrylic acid,
b) 15% by weight of the formula-(I) monomer, in which:
 4. R represents a methacrylate radical,
 5. R' represents a branched hydrophobic chain with 20 carbon atoms of 2-hexyl 1-dodecanyl,
 6. m=p=0, q=1, n=25.

For each of the tests nos. 7 to 9, a paper coating slip is then produced, comprising:

7. 100 parts by dry weight of the aqueous suspension of calcium carbonate to be tested,
8. 11 parts by dry weight of the styrene-butadiene latex sold by DOW™ CHEMICALS under the name DL 966, per 100 parts by dry weight of calcium carbonate,
9. 0.25 parts by dry weight of polyvinyl alcohol, per 100 parts by dry weight of calcium carbonate,
10. 0.6 parts by dry weight of an optical brightener sold by CLARIANT™ under the name Blancophor™ P per 100 parts by dry weight of calcium carbonate,
11. 0.2 parts by dry weight of an acrylic thickener/water retainer sold by COATEX™ under the name Rheocarb™.

For each of the slips obtained from tests nos. 7 to 9, the Brookfield™ viscosities are then determined at 10 and 100 revolutions per minute 25° C., as are their water retentions, using the methods described above. The corresponding results appear in table 4.

If the results are compared, it can be seen that the Brookfield™ viscosities are always greater when the invention is used, and that the water retention is much less with the invention, which means that that the coating slip has penetrated less into the base paper. The printability of the resulting paper will therefore be better, and this will be true for an equal quantity of acrylic polymer (a grinding agent when manufacturing the aqueous suspension, and a thickening agent when manufacturing the coating slip) equal to that used in previous methods.

TABLE 4

| | Test no. | | |
|---|---|---|---|
| | 7 | 8 | 9 |
| Previous method (PA) Invention (IN) | PA | IN | IN |
| μ10 (mPa · s) | 4640 | 17000 | 19200 |
| μ100 (mPa · s) | 850 | 2970 | 2550 |
| PA GWR (g/m2) | 95 | 64 | 60 |

The invention claimed is:

1. A method for manufacturing a paper coating slip containing at least one mineral material, comprising introducing to the slip a thickening agent comprising a water soluble polymer consisting of:
   a) at least one ethylene-unsaturated anionic monomer, and
   b) at least one ethylene-unsaturated oxyalkyl monomer terminating in a branched hydrophobic alkyl, alkaryl, arylalkyl, or aryl chain, saturated or unsaturated, wherein the branched hydrophobic chain has 14 to 21 carbon atoms and two branches each with at least six carbon atoms.

2. The method according to claim 1, wherein the branched hydrophobic chain has 15 to 20 carbon atoms and two branches each with at least six carbon atoms.

3. The method according to claim 1, wherein the polymer consists of, expressed as a percentage by weight of each of the monomers (with the total of these percentages being equal 100%):
   a) 5% to 95%, by molar weight, of the at least one ethylene-unsaturated anionic monomer, and
   b) 5% to 95% of the at least one ethylene-unsaturated oxyalkyl monomer.

4. The method according to claim 1, wherein the polymer consists of, expressed as a percentage by weight of each of the monomers (with the total of these percentages being equal 100%):
   a) 50% to 95%, by molar weight, of the at least one ethylene-unsaturated anionic monomer, and
   b) 5% to 55% of the at least one ethylene-unsaturated oxylalkyl monomer.

5. The method according to claim 1, wherein the polymer consists of, expressed as a percentage by weight of each of the monomers (with the total of these percentages being equal 100%):
   a) 70% to 95%, by molar weight, of the at least one ethylene-unsaturated anionic monomer, and b) 5% to 30% of the at least one ethylene-unsaturated oxyalkyl monomer.

6. The method according to claim 1, wherein monomer a) is acrylic acid, methacrylic acid or mixtures thereof.

7. The method according to claim 1, wherein monomer b) is a formula-(I) monomer:

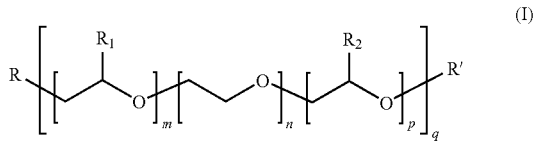

where:
- m, n, p and q are integers and m, n, p are less than 150, q is greater than 0 and at least one integer from among m, n, and p is non-zero,
- R represents a radical containing a polymerisable unsaturated function, a vinyl, an acrylic, methacrylic, or maleic ester, an unsaturated urethane, acrylurethane, methacrylurethane, α-' adimethyl-isopropenyl-benzylurethane, allyl urethane, an allyl or vinyl ether, whether substituted or not, or an ethylene-unsaturated amide or imide,
- $R_1$ and $R_2$ are identical or different, and represent hydrogen atoms or alkyl groups,
- R' is a branched hydrophobic alkyl, alkaryl, arylalkyl, or aryl chain, saturated or unsaturated, with 14 to 21 carbon atoms and two branches each with at least six carbon atoms.

8. The method according to claim 7, wherein R' is a branched hydrophobic alkyl, alkaryl, arylalkyl, or aryl chain, saturated or unsaturated, with 15 to 20 carbon atoms and two branches each with at least six carbon atoms.

9. The method according to claim 7, wherein R' is 2-hexyl 1-decanyl, 2-octyl 1-dodecanyl, or a mixture thereof.

10. The method according to claim 7, wherein R' is 2-hexyl 1-decanyl.

11. The method according to claim 7, wherein R' is 2-octyl 1-dodecanyl.

12. The method according to claim 1, wherein the water-soluble polymer is partially or totally neutralized by one or more neutralization agents with a monovalent or polyvalent function.

13. The method according to claim 1, wherein the water-soluble polymer is partially or totally neutralized by sodium hydroxide, potassium hydroxide or a mixture thereof.

14. The method according to claim 7, wherein monomer a) is acrylic acid, and monomer b) is a formula-(I) monomer in which R is a methyacrylate, R' is 2-hexyl 1-decanyl, m and p are 0, q is 1, and n is 25, wherein the water soluble polymer is totally neutralized.

15. The method according to claim 1, wherein the mineral material is natural or synthetic calcium carbonate, kaolin, talc, or any mixture thereof.

16. The method according to claim 1, wherein the mineral material is natural or synthetic calcium carbonate.

17. The method according to claim 1, wherein the mineral material is a mixture of natural calcium carbonate and kaolin.

18. The method according to claim 1, wherein 0.1 to 2% of the thickening agent, based on the dry weight of the mineral material, is introduced to the slip.

19. The method according to claim 1, wherein 0.2 to 0.8% of the thickening agent, based on the dry weight of the mineral material, is introduced to the slip.

20. The method according to claim 1, wherein the agent is introduced to the slip by adding the agent directly to the slip.

21. The method according to claim 1, wherein the agent is introduced to the slip by adding the agent to the mineral material following by adding the mineral material and the thickening agent to the slip.

22. The method according to claim 1, wherein the agent is added to the mineral material during a dispersion, a grinding and/or a concentration stage of the mineral matter, optionally followed by a drying stage.

23. A paper coating slip comprising at least one mineral material and a thickening agent, wherein the thickening agent comprises a water-soluble polymer consisting of:
   a) at least one ethylene-unsaturated anionic monomer, and
   b) at least one ethylene-unsaturated oxyalkyl monomer terminating in a branched hydrophobic alkyl, alkaryl, arylalkyl, or aryl chain, saturated or unsaturated, wherein the hydrophobic chain has 14 to 21 carbon atoms and two branches each with at least six carbon atoms.

24. The coating slip according to claim 23, wherein the hydrophobic chain has 15 to 20 carbon atoms and two branches each with at least six carbon atoms.

25. The coating slip according to claim 23, wherein the polymer consists of, expressed as a percentage by weight of each of the monomers (with the total of these percentages being equal 100%):
   a) 5% to 95%, by molar weight, of the at least one ethylene-unsaturated anionic monomer, and
   b) 5% to 95% of the at least one ethylene-unsaturated oxyalkyl monomer.

26. The coating slip according to claim 23, wherein the polymer consists of, expressed as a percentage by weight of each of the monomers (with the total of these percentages being equal 100%):
   a) 50% to 95%, by molar weight, of the at least one ethylene-unsaturated anionic monomer, and
   b) 5% to 55% of the at least one ethylene-unsaturated oxyalkyl monomer.

27. The coating slip according to claim 23, wherein the polymer consists of, expressed as a percentage by weight of each of the monomers (with the total of these percentages being equal 100%):
   a) 70% to 95%, by molar weight, of the at least one ethylene-unsaturated anionic monomer, and
   b) 5% to 30% of the at least one ethylene-unsaturated oxyalkyl monomer.

28. The coating slip according to claim 23, wherein monomer a) is acrylic acid, methacrylic acid or mixtures thereof.

29. The coating slip according to claim 23, wherein the water-soluble polymer is partially or totally neutralized by one or more neutralization agents with a monovalent or polyvalent function.

30. The coating slip according to claim 23, wherein the water-soluble polymer is partially or totally neutralized by sodium hydroxide, potassium hydroxide or a mixture thereof.

31. The coating slip according to claim 23, wherein the mineral material is natural or synthetic calcium carbonate, kaolin, talc, or any mixture thereof.

32. The coating slip according to claim 23, wherein the mineral material is natural or synthetic calcium carbonate.

33. The coating slip according to claim 23, wherein the mineral material is a mixture of natural calcium carbonate and kaolin.

34. The coating slip according to claim 23, wherein the slip comprises 0.1 to 2% of the thickening agent, based on the dry weight of the mineral material.

35. The coating slip according to claim 23, wherein the slip comprises 0.2 to 0.8% of the thickening agent, based on the dry weight of the mineral material.

36. The coating slip according to claim 23, wherein monomer b) is a formula-(I) monomer:

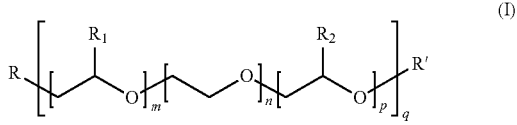

where:
- m, n, p and q are integers and m, n, p are less than 150, q is greater than 0 and at least one integer from among m, n, and p is non-zero,
- R represents a radical containing a polymerisable unsaturated function, a vinyl, an acrylic, methacrylic, or maleic ester, an unsaturated urethane, acrylurethane, methacrylurethane, α-' adimethyl-isopropenyl-benzylurethane, allyl urethane, an allyl or vinyl ether, whether substituted or not, or an ethylene-unsaturated amide or imide,
- $R_1$ and $R_2$ are identical or different, and represent hydrogen atoms or alkyl groups,
- R' is a branched hydrophobic alkyl, alkaryl, arylalkyl, or aryl chain, saturated or unsaturated, with 14 to 21 carbon atoms and two branches each with at least six carbon atoms.

37. The coating slip according to claim 36, wherein R' is a branched hydrophobic alkyl, alkaryl, arylalkyl, or aryl chain, saturated or unsaturated, with 15 to 20 carbon atoms and two branches each with at least six carbon atoms.

38. The coating slip according to claim 36, wherein R' is 2-hexyl 1-decanyl, 2-octyl 1-dodecanyl, or a mixture thereof.

39. The coating slip according to claim 36, wherein R' is 2-hexyl 1-decanyl.

40. The coating slip according to claim 36, wherein R' is 2-octyl 1-dodecanyl.

41. The coating slip according to claim 36, wherein monomer a) is acrylic acid, and monomer b) is a formula-(I) monomer in which R is a methyacrylate, R' is 2-hexyl 1-decanyl, m and p are 0, q is 1, and n is 25, wherein the water soluble polymer is totally neutralized.

* * * * *